United States Patent
McGregor et al.

(10) Patent No.: US 10,281,054 B2
(45) Date of Patent: May 7, 2019

(54) VALVE GUARD FOR VALVE ASSEMBLY

(71) Applicant: Caterpillar Inc., Deerfield, IL (US)

(72) Inventors: Scott Andrew McGregor, Lisle, IL (US); Dhiraj Piste, Rolling Meadows, IL (US); Andrew Grzesiak, Montgomery, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/705,939

(22) Filed: Sep. 15, 2017

(65) Prior Publication Data

US 2019/0085994 A1     Mar. 21, 2019

(51) Int. Cl.
*E02F 9/08* (2006.01)
*F16K 27/12* (2006.01)
*E02F 9/22* (2006.01)

(52) U.S. Cl.
CPC ............ *F16K 27/12* (2013.01); *E02F 9/0875* (2013.01); *E02F 9/2275* (2013.01); *Y10T 137/7043* (2015.04)

(58) Field of Classification Search
CPC .................. E02F 9/0875; E02F 9/2275; Y10T 137/7043; Y10T 137/71
See application file for complete search history.

(56) References Cited

U.S. PATENT DOCUMENTS

| | | | | |
|---|---|---|---|---|
| 4,156,487 A * | 5/1979 | Dowd | .................. | E02F 3/36 138/110 |
| 4,774,277 A * | 9/1988 | Janac | .................. | C08L 23/04 523/351 |
| 5,232,330 A * | 8/1993 | Rae | .................. | E02F 3/6273 414/686 |
| 5,516,581 A * | 5/1996 | Kreckel | .................. | A47G 1/175 428/317.3 |
| 5,622,206 A | 4/1997 | Takeuchi et al. | | |
| 6,135,223 A | 10/2000 | Miyachi et al. | | |
| 6,467,734 B1 * | 10/2002 | Brown | .................. | E03C 1/021 248/65 |
| 6,637,455 B1 | 10/2003 | Tappe | | |
| 7,028,703 B1 | 4/2006 | Warner et al. | | |
| 7,396,500 B2 | 7/2008 | Wani et al. | | |
| 7,530,418 B2 | 5/2009 | Ishii et al. | | |
| 7,806,629 B2 * | 10/2010 | McCoy | .................. | H02G 9/08 211/60.1 |
| 8,015,994 B2 * | 9/2011 | Sekihara | .................. | B60T 17/02 137/377 |
| 8,707,984 B2 * | 4/2014 | Lundgren | .................. | E02F 9/2267 137/354 |
| 8,950,538 B2 * | 2/2015 | Kurauchi | .................. | E02F 9/08 172/813 |
| 9,228,691 B2 * | 1/2016 | Ezaki | .................. | F16L 57/00 |

(Continued)

*Primary Examiner* — Kevin F Murphy

(74) *Attorney, Agent, or Firm* — Oblon, McClelland, Maier & Neustadt

(57) ABSTRACT

A valve guard for a valve assembly associated with a machine includes a first portion and a second portion disposed adjacent to the first portion. Each of the first and second portions includes a plurality of tabs. Further, at least one tab of the plurality of tabs is adapted to be removed from the first and second portions based on a configuration of the valve assembly. The removal of the at least one tab from the first and second portions provides at least one passage for connecting at least one fluid line with the valve assembly.

17 Claims, 6 Drawing Sheets

(56) References Cited

U.S. PATENT DOCUMENTS

| | | | |
|---|---|---|---|
| 9,303,780 B2 | 4/2016 | Knauss et al. | |
| 9,482,253 B2 * | 11/2016 | Handa | E02F 9/00 |
| 9,638,369 B1 * | 5/2017 | Spilker | F16L 57/06 |
| 2007/0120023 A1 * | 5/2007 | Martinez | E02F 9/2275 |
| | | | 248/75 |
| 2009/0038691 A1 | 2/2009 | Birch et al. | |
| 2015/0267831 A1 | 9/2015 | Beschorner et al. | |
| 2016/0230897 A1 | 8/2016 | Munetomo et al. | |

* cited by examiner

VALVE GUARD FOR VALVE ASSEMBLY

TECHNICAL FIELD

The present disclosure relates to a valve assembly associated with a machine, and more particularly to a valve guard for the valve assembly associated with the machine.

BACKGROUND

Machines, such as a wheel loader or a backhoe loader, include a number of valves that are used during machine operation. A configuration of such valves changes based on specifications of the machines such as net power, operating weight, pay load, and a type of industry in which the machines are deployed.

The valves are typically covered by a valve guard. Currently, the valve guards consist of a sheet metal plate and a rubber baffling. The rubber baffling is adapted to allow passage of one or more fluid lines that are connected to the valve. Generally, a number of the fluid lines and a position of the fluid lines are based on the configuration of the valve. Hence, each configuration of the valve requires the valve guard to have a unique design, which leads to a proliferation of parts of the valve guard. Further, during a servicing of the valve, the valve guard including the fluid lines needs to be removed from the machine, which increases cost and complexity that is associated with the servicing of the valve.

U.S. Patent Publication Number 2009/0038691 describes a valve guard assembly for a gas cylinder. The valve guard assembly has a mounting collar which is adapted to fit around and to engage a neck of the gas cylinder. The mounting collar has an outer surface in which there is an endless first coupling member in the form of a circumferential slot. A valve guard has an integral coupling ring with a second coupling member in the form of an endless inward projection engageable with the circumferential slot. A means for acting against disengagement of the first and second coupling members is provided. This means takes the form of a locking band.

SUMMARY OF THE DISCLOSURE

In one aspect of the present disclosure, a valve guard for a valve assembly associated with a machine is provided. The valve guard includes a first portion and a second portion disposed adjacent to the first portion. Each of the first and second portions includes a plurality of tabs. Further, at least one tab of the plurality of tabs is adapted to be removed from the first and second portions based on a configuration of the valve assembly. The removal of the at least one tab from the first and second portions provides at least one passage for connecting at least one fluid line with the valve assembly.

In another aspect of the present disclosure, a machine is provided. The machine includes a frame and a valve assembly disposed within the frame. The machine also includes a valve guard covering the valve assembly within the frame. The valve guard includes a first portion and a second portion disposed adjacent to the first portion. Each of the first and second portions includes a plurality of tabs. Further, at least one tab of the plurality of tabs is adapted to be removed from the first and second portions based on a configuration of the valve assembly. The removal of the at least one tab from the first and second portions provides at least one passage for connecting at least one fluid line with the valve assembly.

In yet another aspect of the present disclosure, a method of installing a valve guard for a valve assembly on a machine is provided. The valve guard includes a first portion and a second portion disposed adjacent to the first portion. The method includes removing at least one tab from a plurality of tabs formed on each of the first and second portions to provide at least one passage. The at least one tab is removed based on a configuration of the valve assembly. The method also includes connecting at least one fluid line with the valve assembly by passing the at least one fluid line through the at least one passage.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
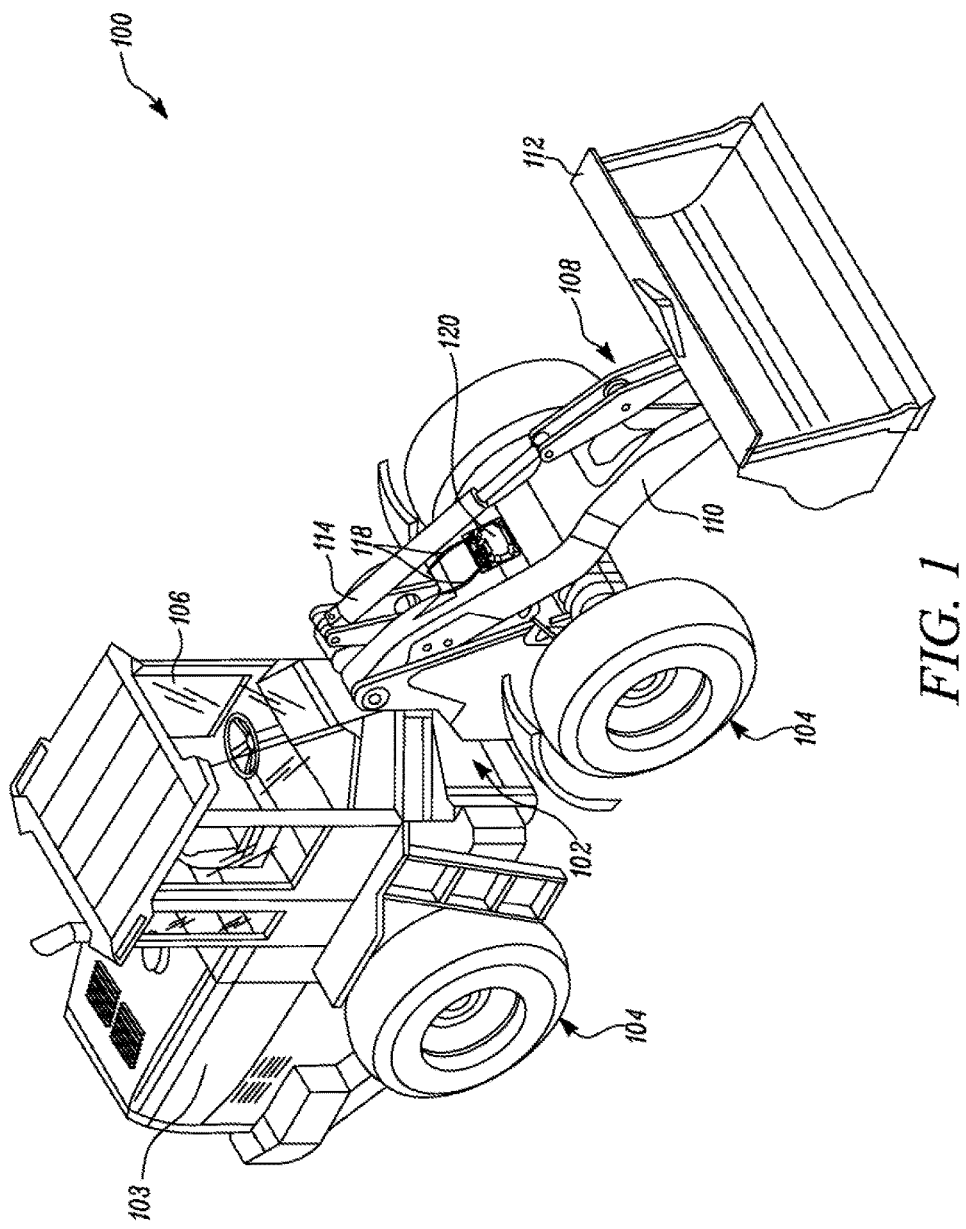
FIG. 1 is a perspective view of an exemplary machine.

FIG. 1 is a perspective view of an exemplary machine 100. In the illustrated embodiment, the machine 100 is embodied as a wheel loader. Alternatively, the machine 100 may embody any other machine, such as a backhoe loader, an excavator, a dozer, and the like. Further, the machine 100 can operate at a worksite, such as a mine, a landfill, a quarry, a construction site, and the like. The machine 100 may perform operations associated with an industry such as agricultural, construction, waste management, forestry, mining, or any other industry known in the art.

The machine 100 includes a frame 102 and a power source (not shown) is disposed within an enclosure 103 formed in the frame 102. The power source may be any power source known in the art such as an internal combustion engine, an electric motor, batteries, and the like. The power source provides power to the machine 100 for operational and mobility requirements. The machine 100 includes a set of ground engaging members 104, such as wheels. The ground engaging members 104 are adapted to provide mobility to the machine 100 on a ground surface.

The machine 100 also includes a drivetrain (not shown) coupled to the power source and the ground engaging members 104. The drivetrain may include a transmission assembly having one or more gears, shafts, differentials, torque converters, hydraulic pumps or motors, and the like. The drivetrain may be adapted to transmit motive power from the power source to the ground engaging members 104.

The machine 100 further includes an operator cabin 106. The operator cabin 106 includes an operator interface (not shown). The operator interface may include one or more input devices including, but not limited to, pedals, steering, joystick, knobs, levers, switches, and a display unit.

The machine 100 includes a linkage assembly 108. The linkage assembly 108 includes an arm 110 pivotally coupled to the frame 102. An implement 112, such as a bucket, is pivotally coupled to the arm 110. It should be noted that the implement 112 may alternatively include an auger, a blade, a fork, a hammer, a ripper, and the like. The linkage assembly 108 also includes cylinders 114 for providing a required spatial movement to the arm 110 and the implement 112 with respect to the frame 102 of the machine 100. The cylinders 114 may be hydraulic cylinders or pneumatic cylinders.

The implement 112 of the linkage assembly 108 performs operations such as, earth moving, excavation, digging, demolition, and so on. Further, the linkage assembly 108 may be controlled hydraulically, pneumatically or by a combination thereof. The linkage assembly 108 includes a valve assembly 116 (shown in FIG. 4) fluidly connected to the cylinders 114 for controlling the operations of the linkage assembly 108. The valve assembly 16 is positioned within the frame 102 of the machine 100. The valve assembly 116 may be fluidly connected to the cylinders 114 using a number of fluid lines 118. In one example, the valve assembly 116 is embodied as a third function valve that allows different implements to be connected on the machine 100. The valve assembly 116 may be a pneumatic valve assembly or a hydraulic valve assembly. The valve assembly 116 may enable the cylinders 114 to control a tilt of the implement 112, an extension of the cylinders 114, a height of the implement 112, and the like.

The valve assembly 116 is enclosed within the frame 102 of the machine 100 by a valve guard 120. The valve guard 120 is coupled to the frame 102 of the machine 100. The valve guard 120 is made of a non-metallic material. More particularly, the valve guard 120 is made of High Density Polyethylene (HDPE). Alternatively, any other material may be used to manufacture the valve guard 120, without any limitations.

In one example, the valve guard 120 may be manufactured by a thermoforming process. During the thermoforming process, an HDPE sheet is clamped into a holding device and heated until it is softened. Further, the HDPE sheet is held horizontally over a mold having a shape of the valve guard 120 and pressed into or stretched over the mold using at least one of vacuum pressure, air pressure, and mechanical force. The softened HDPE sheet conforms to the shape of the mold and is held in place until the HDPE sheet cools. Further, an excess material is trimmed and the valve guard 120 is released from the mold. Alternatively, any other process may be used to manufacture the valve guard 120, without any limitations. The valve guard 120 will now be explained in detail with reference to FIG. 2. It should be noted that the details of the valve guard 120 provided below is equally applicable to valve guards associated with any other valve assembly of the machine 100, without any limitations.

Figure 2:
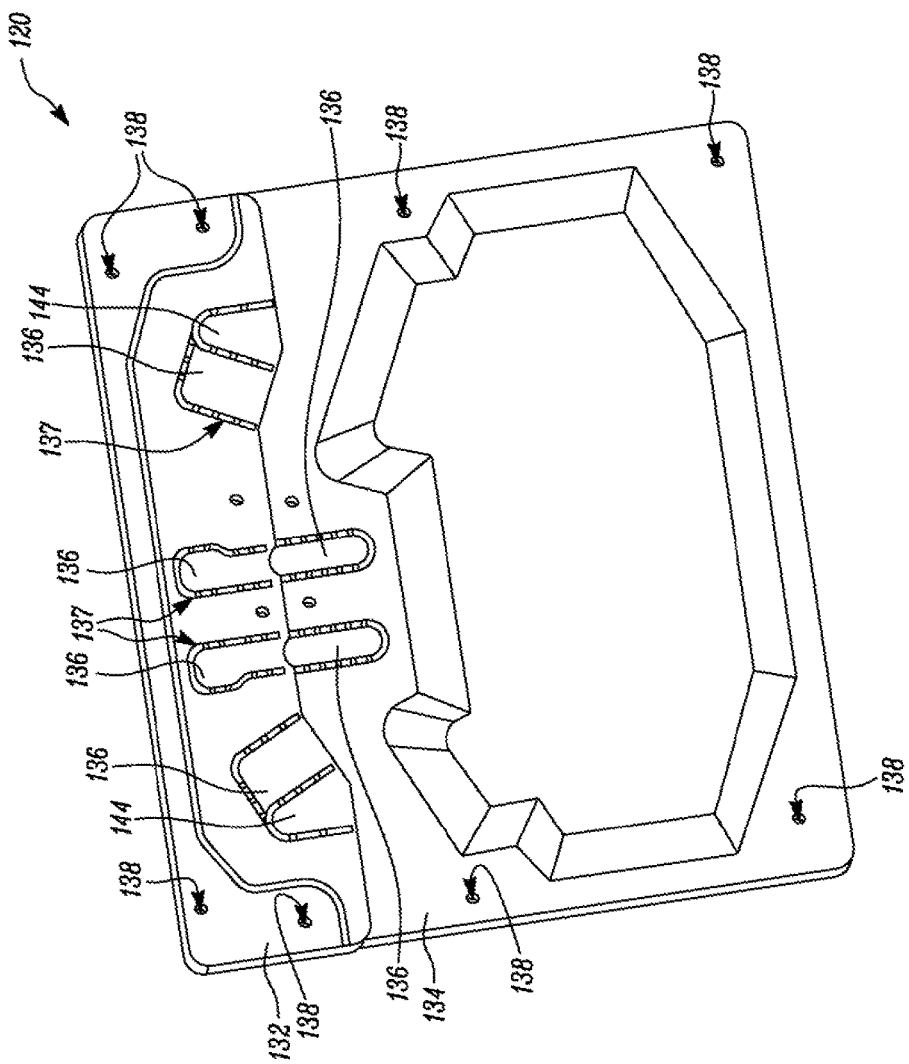
FIG. 2 is a front perspective view of a valve guard associated with the machine of FIG. 1, according to one embodiment of the present disclosure.

Referring to FIG. 2, the valve guard 120 includes a first portion 132 and a second portion 134. The second portion 134 is disposed adjacent to the first portion 132. In the illustrated example, a length of the second portion 134 is greater than a length of the first portion 132. Each of the first and second portions 132, 134 includes a number of tabs 136. In the illustrated embodiment, the first portion 132 includes six tabs and the second portion 134 includes two tabs. However, a total number of the tabs 136 may vary, without any limitations. Each of the tabs 136 is defined by a cut-out region 137 formed around each of the tabs 136. The tabs 136 are removable from the first and second portions 132, 134 to provide passages 135 (shown in FIG. 3) for connecting the fluid lines 118 with the valve assembly 116. The tabs 136 are removed from the first and second portions 132, 134 based on a configuration of the valve assembly 116. Each of the tabs 136 may be removed by cutting through the cut-out region 137. It should be noted that the tabs 136 can be cut by any known cutting tools, such as, a circular saw and a coarse tooth blade, without any limitations.

Figure 3:
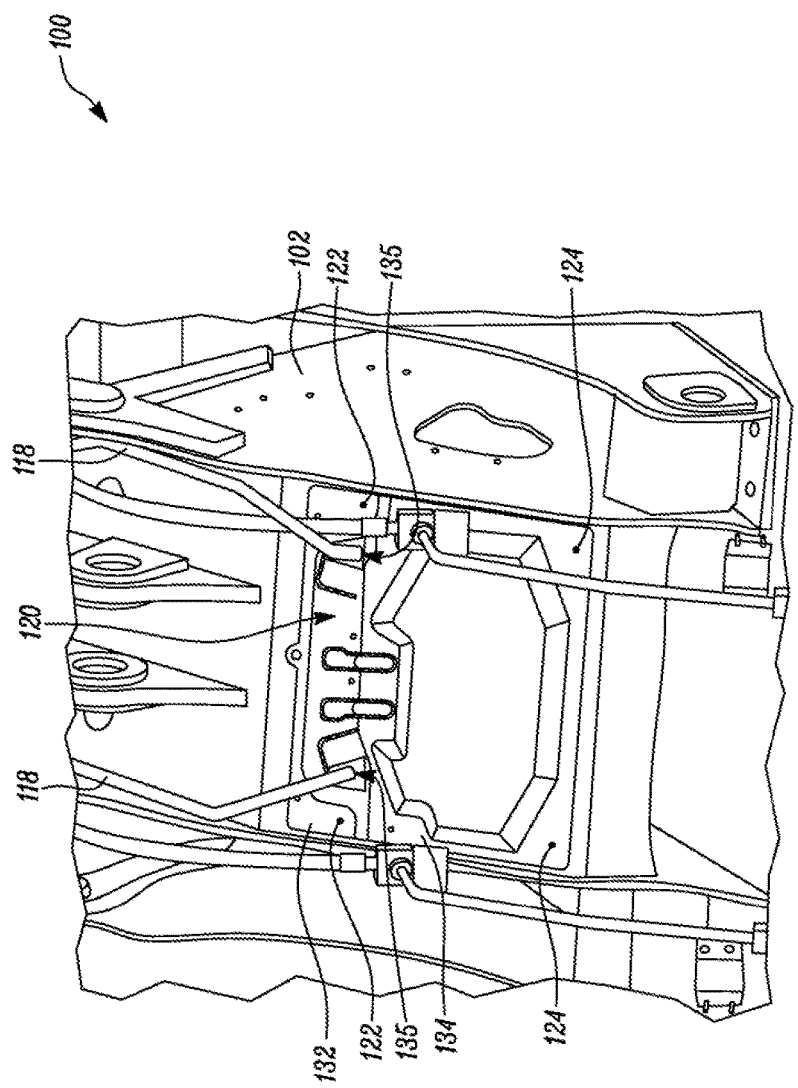
FIG. 3 is a perspective view of a front portion of the machine illustrating the valve guard covering a valve assembly having a first configuration, according to one embodiment of present disclosure.

The first portion 132 of the valve guard 120 is coupled to the frame 102 of the machine 100 using a number of fastening members 122 (shown in FIG. 3). The second portion 134 of the valve guard 120 is also coupled to the frame 102 using a number of fastening members 124 (shown in FIG. 3). The first and second portions 132, 134 include a number of apertures 138 for receiving the fastening members 122, 124 for coupling the valve guard 120 with the fame 102 of the machine 100. The first portion 132 includes six apertures and the second portion 134 includes four apertures. It may be noted that the number of apertures 138 in the first portion 132 and the number of apertures 138 in the second portion 134 may vary without any limitations. It should be noted that the first and second portions 132, 134 are coupled to the frame 102 separately. The valve guard 120 may be coupled or removed from the frame 102 based on fastening and removal of the fastening members 122, 124. The apertures 138 in the first and second portions 132, 134 are aligned with apertures in the frame 102 of the machine 100 to receive the fastening members 122, 124, respectively. In one embodiment, the fastening members 122, 124 are bolts. It may be noted that the fastening members 122, 124 may alternatively include pins, rivets, screws, and/or the like.

It should be noted that the valve guard 120 can be associated with a number of machines having different configurations of valve assembly. The configuration of the valve assembly 116 may change based on specifications of the machine 100 including, but not limited to, net power, operating weight, pay load, and a type of industry in which the machine 100 is deployed. For example, one or more tabs 136 are removed from the first and second portions 132, 134 corresponding to a configuration of the valve assembly 116. It may be noted that the number of fluid lines 118 connected to the valve assembly 116 and a position of the fluid lines 118 may change according to the configuration of the valve assembly 116.

FIG. 3 is a perspective view of the valve guard 120 covering the valve assembly 116 having a first configuration, according to one embodiment of present disclosure. For the valve assembly 116 having the first configuration, two fluid lines 118 are to be connected with the valve assembly 116. Accordingly, a first set of tabs 144 (shown in FIG. 2) is to be removed from the first portion 132 to provide the two passages 135 for connecting the fluid lines 118 with the valve assembly 116.

During installation of the valve guard 120 for covering the valve assembly 116, the first set of tabs 144 are removed from the valve guard 120 to provide the two passages 135. The two passages 135 allow the fluid lines 118 to pass therethrough. Thus, the fluid lines 118 are connected to the valve assembly 116 by passing each of the fluid lines 118 through each of the two passages 135.

Figure 4:
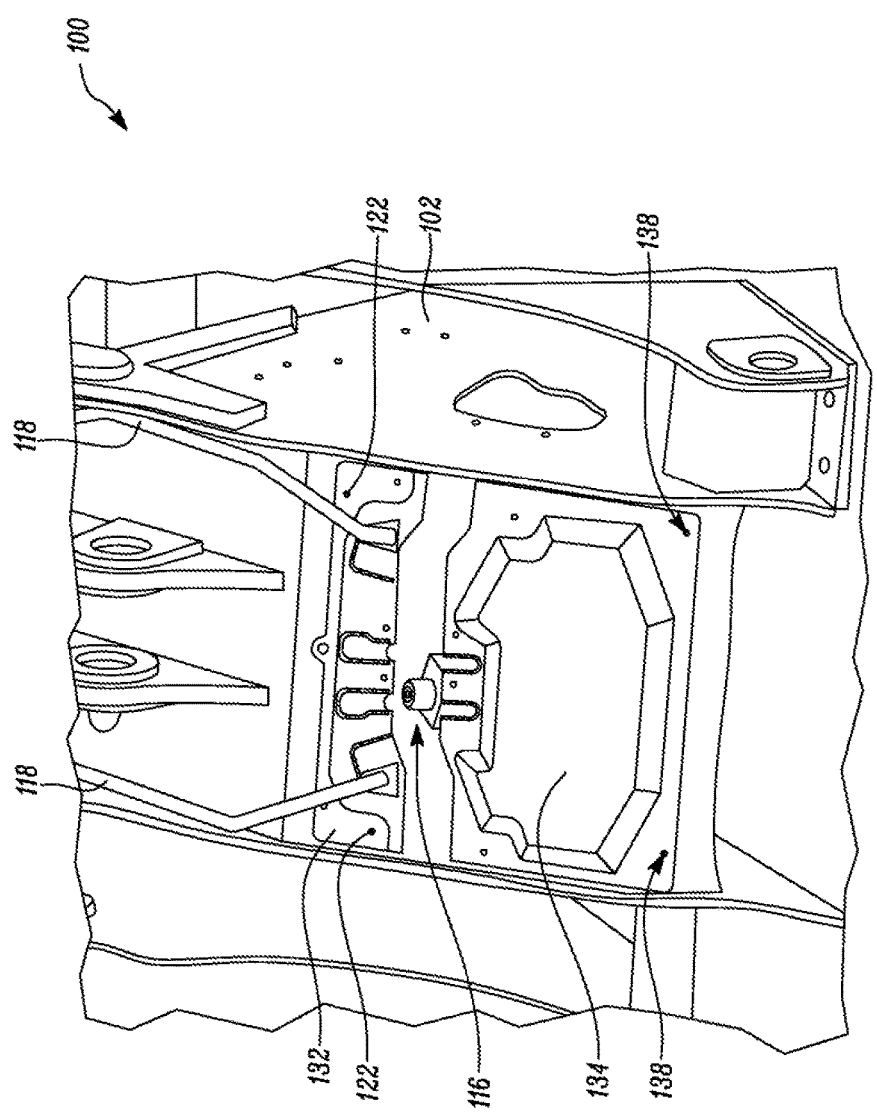
FIG. 4 is an exploded view of the valve guard of FIGS. 2 and 3 depicting a second portion of the valve guard being removed from the machine.

Referring now to FIG. 4, the second portion 134 is removable from the frame 102 to provide access to the valve assembly 116 during a servicing of the valve assembly 116. The fastening members 124 used for coupling the second portion 134 are removed for removing the second portion 134, while the first portion 132 remains coupled to the frame 102 and the fluid lines 118 remain coupled with the valve assembly 116.

Figure 5:
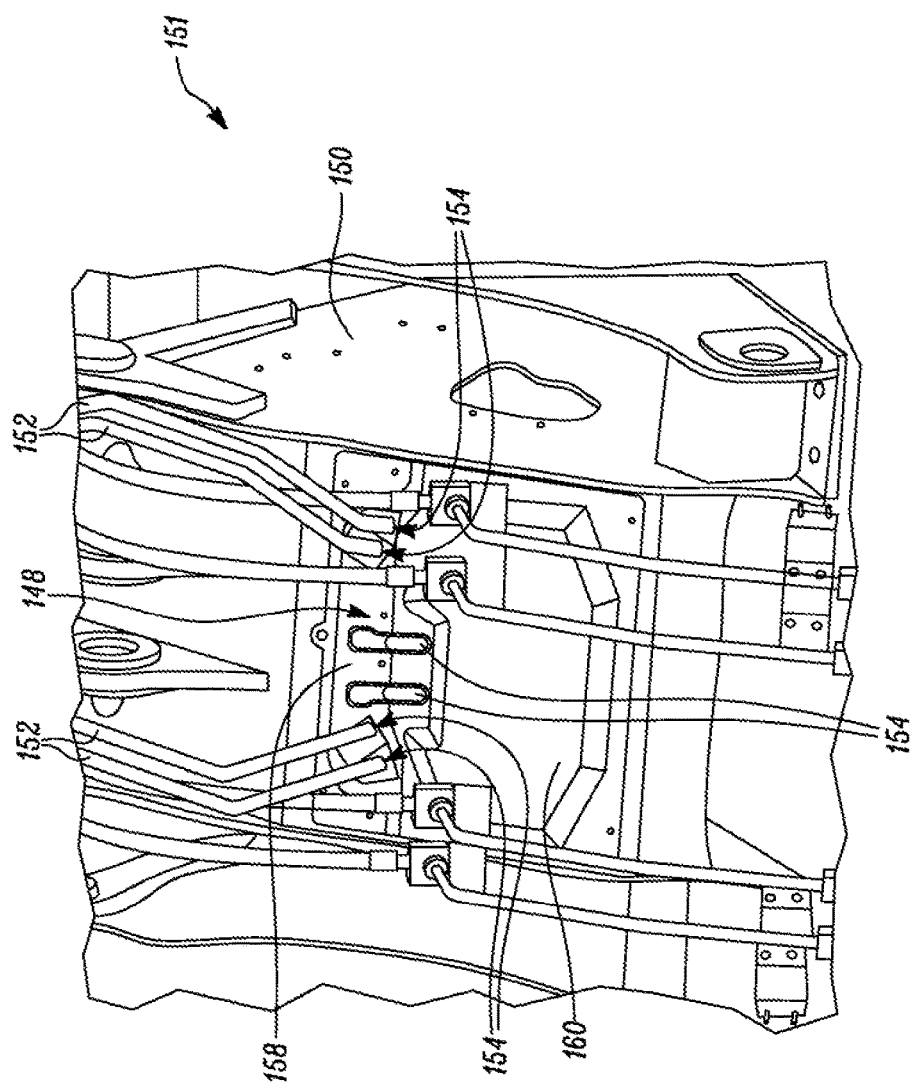
FIG. 5 is a perspective view of a front portion of a machine illustrating a valve guard covering a valve assembly having a second configuration, according to another embodiment of the present disclosure.

FIG. 5 illustrates another embodiment of the present disclosure. In this embodiment, a valve guard 148 is used for cover a valve assembly (not shown) having a second configuration. The valve guard 148 includes a first portion 158 and a second portion 160. The first portion 158 is coupled to a frame 150 of a machine 151 using a number of fastening members 162. Further, the second portion 160 is coupled to the frame 150 using a number of fastening members 164. It should be noted that design of the valve guard 148 is similar to the design of the valve guard 120 shown in FIGS. 2, 3, and 4. For the valve assembly having the second configuration, four fluid lines 152 are to be connected with the valve assembly. Hence, four passages 155 are provided in the valve guard 148 for each of the four fluid lines 152. Accordingly, a second set of tabs (not shown) from the tabs 154 of the valve guard 148 are removed to provide the four passages 155 for the fluid lines 152.

During installation of the valve guard 148 for the valve assembly having the second configuration, the second set of tabs are removed from the valve guard 148 to provide the four passages 155 for the fluid lines 152. The two passages 155 allow the fluid lines 152 to pass therethrough. Thus, the fluid lines 152 are connected to the valve assembly by passing each of the fluid lines 152 through the four passages 155.

INDUSTRIAL APPLICABILITY

The present disclosure relates to the valve guard 120, 148 for the valve assembly 116 and a method 600 of installing the valve guard 120, 148 for the valve assembly 116. The valve guard 120, 148 includes the first portion 132, 158 and the second portion 134, 160. The first portion 132, 158 and the second portions 134, 160 includes the tabs 136, 154. Further, one or more of the tabs 136, 154 is removed from the first portion 132, 158 or the second portion 134, 160 to provide the passages 135, 155 for connecting the fluid lines 118, 152 with the valve assembly 116. It should be noted that the one or more tabs 136, 154 are removed based on the configuration of the valve assembly 116. Hence, the present disclosure provides the valve guard 120, 148 that can be associated with multiple machines having different configurations of the valve assembly. Accordingly, a dealer can stock the valve guard 120, 148 instead of stocking multiple valve guards having different designs. Further, the valve guard 120, 148 is cost effective and simple to design and manufacture.

Moreover, the tabs 136, 154 may be easily removed by cutting though the cut-out region 137. Further, the second portion 134, 160 may be removed easily from the frame 102, 150 to provide access to the valve assembly 116 during the servicing of the valve assembly 116. The valve guard 120, 148 thus eliminates requirement of removal of the entire valve guard 120, 148 and the fluid lines 118, 152 while servicing the valve assembly 116.

Figure 6:
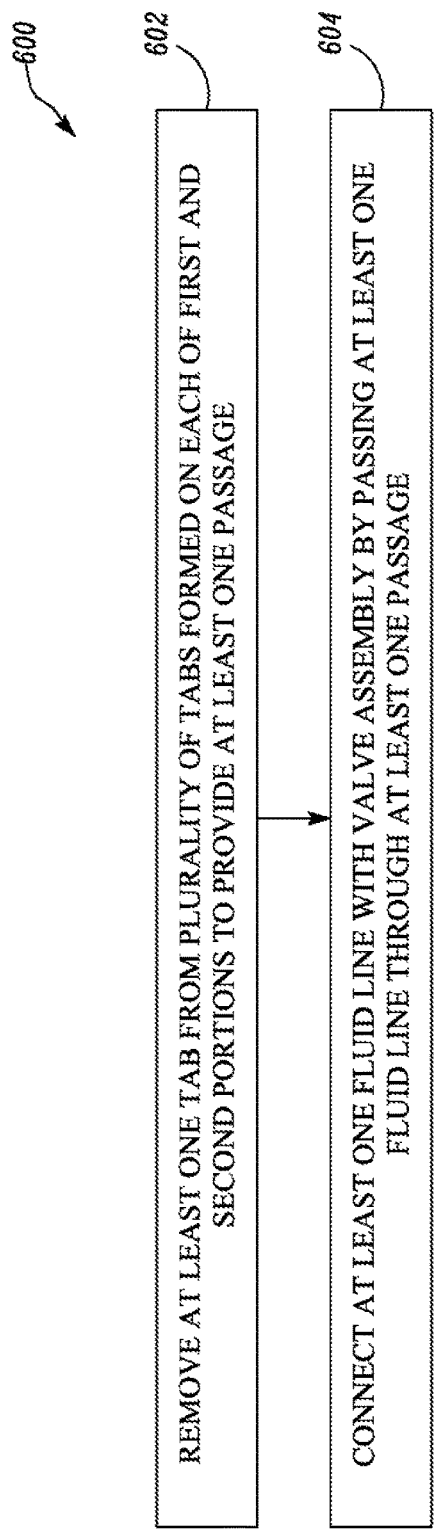
FIG. 6 is a flowchart for a method of installing the valve guard for the valve assembly on the machine.

FIG. 6 is a flowchart for the method 600 of installing the valve guard 120, 148 for the valve assembly 116 on the machine 100, 151. The valve guard 120, 148 includes the first portion 132, 158 and the second portion 134, 160 disposed adjacent to the first portion 132, 158. The valve guard 120, 148 is made of a non-metallic material. In one example, the valve guard 120, 148 is made of HDPE. The valve guard 120, 148 is manufactured by the thermoforming process.

At step 602, one or more of the tabs 136, 154 is removed from the first portion 132, 158 and/or the second portion 134, 160 to provide the passages 135, 155. The one or more tabs 136, 154 are removed based on the configuration of the valve assembly 116. The configuration of the valve assembly 116 changes based on specifications of the machine 100, 151.

At step 604, the fluid lines 118, 152 are connected with the valve assembly 116 by passing the fluid lines 118, 152 through the passages 135, 155. Also, the first portion 132, 158 of the valve guard 120, 148 is coupled with the frame 102, 150 of the machine 100, 151 using the fastening members 122, 124. The second portion 134, 160 of the valve guard 120, 148 is coupled with the frame 102, 150 of the machine 100, 151 using the fastening members 162, 164. Further, the second portion 134, 160 of the valve guard 120, 148 is removable from the frame 102, 150 to provide access to the valve assembly 116 during the servicing of the valve assembly 116.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A configurable valve guard for a valve assembly associated with a machine, the valve guard comprising:
   a first portion; and
   a second portion disposed adjacent to the first portion,
   wherein each of the first and second portions include a plurality of built-in tabs, each of the built-in tabs being defined by a perforated region,
   wherein each of the plurality of tabs is adapted to be permanently removed from the respective first portion or second portion based on a configuration of the valve assembly, to provide at least one passage from a first surface to a second surface of the respective first portion or second portion for connecting at least one fluid line with the valve assembly,
   wherein the valve guard is coupled to a frame of the machine using fastening members, and
   wherein each of the first portion and the second portion is coupled to the frame such that the fastening members extend through the respective first portion or second portion from the first surface to the second surface.

2. The valve guard of claim 1, wherein the second portion is removable from the frame, without removing the first portion from the frame, to provide access to the valve assembly during a servicing of the valve assembly.

3. The valve guard of claim 1, wherein the valve guard is made of a non-metallic material.

4. The valve guard of claim 3, wherein the valve guard is made of high density polyethylene.

5. The valve guard of claim 3, wherein the valve guard is manufactured by a thermoforming process.

6. The valve guard of claim 1, wherein the valve guard is adapted to be associated with a plurality of machines having different configurations of valve assembly.

7. A machine comprising:
a frame;
a valve assembly disposed within the frame; and
a configurable valve guard covering the valve assembly within the frame, wherein the valve guard includes:
   a first portion; and
   a second portion disposed adjacent to the first portion,
   wherein each of the first and second portions include a plurality of built-in tabs, each of the built-in tabs being defined by a perforated region,
   wherein each of the plurality of tabs is adapted to be permanently removed from the respective first portion or second portion based on a configuration of the valve assembly, to provide at least one passage from a first surface to a second surface of the respective first portion or second portion for connecting at least one fluid line with the valve assembly,
   wherein the valve guard is coupled to the frame using fastening members, and
   wherein each of the first portion and the second portion is coupled to the frame such that the fastening members extend through the respective first portion or second portion from the first surface to the second surface.

8. The machine of claim 7, wherein the second portion is removable from the frame, without removing the first portion from the frame, to provide access to the valve assembly during a servicing of the valve assembly.

9. The machine of claim 7, wherein the valve guard is made of a non-metallic material.

10. The machine of claim 9, wherein the valve guard is made of high density polyethylene.

11. The machine of claim 9, wherein the valve guard is manufactured by a thermoforming process.

12. The machine of claim 7, wherein the valve guard is adapted to be associated with a plurality of machines having different configurations of valve assembly.

13. A method of installing a configurable valve guard for a valve assembly on a machine, wherein the valve guard includes a first portion and a second portion disposed adjacent to the first portion, wherein each of the first and second portions include a plurality of built-in tabs, each of the built-in tabs being defined by a perforated region, and wherein each of the plurality of tabs is adapted to be permanently removed from the respective first portion or second portion based on a configuration of the valve assembly, to provide at least one passage from a first surface to a second surface of the respective first portion or second portion for connecting at least one fluid line with the valve assembly, the method comprising:
   permanently removing at least one of said built-in tabs of said plurality of built-in tabs to provide said at least one passage, wherein said at least one built-in tab is permanently removed based on the configuration of the valve assembly;
   coupling the valve guard with a frame of the machine using fastening members; and
   connecting said at least one fluid line with the valve assembly by passing the at least one fluid line through the at least one passage,
   wherein each of the first portion and the second portion is coupled to the frame such that the fastening members extend through the respective first portion or second portion from the first surface to the second surface.

14. The method of claim 13 further comprising removing the second portion of the valve guard from the frame, without removing the first portion from the frame, to provide access to the valve assembly during servicing of the valve assembly.

15. The method of claim 13, wherein the valve guard is made of a non-metallic material.

16. The method of claim 15, wherein the valve guard is made of high density polyethylene.

17. The method of claim 15, wherein the valve guard is manufactured by a thermoforming process.

* * * * *